(12) United States Patent
Cornelius et al.

(10) Patent No.: US 9,819,413 B2
(45) Date of Patent: Nov. 14, 2017

(54) METHODS FOR DETERMINING RECEIVER COUPLING EFFICIENCY, LINK MARGIN, AND LINK TOPOLOGY IN ACTIVE OPTICAL CABLES

(71) Applicant: Samtec, Inc., New Albany, IN (US)

(72) Inventors: Joshua R. Cornelius, Los Altos, CA (US); Eric J. Zbinden, Sunnyvale, CA (US); William J. Kozlovsky, Sunnyvale, CA (US); David A. Langsam, Sunnyvale, CA (US)

(73) Assignee: SAMTEC, INC., New Albany, IN (US)

( * ) Notice: Subject to any disclaimer, the term of this patent is extended or adjusted under 35 U.S.C. 154(b) by 0 days.

(21) Appl. No.: 15/435,807

(22) Filed: Feb. 17, 2017

(65) Prior Publication Data

US 2017/0163339 A1   Jun. 8, 2017

Related U.S. Application Data

(62) Division of application No. 14/885,000, filed on Oct. 16, 2015, now Pat. No. 9,638,874.

(Continued)

(51) Int. Cl.
  *G01N 21/00* (2006.01)
  *H04B 10/079* (2013.01)
(Continued)

(52) U.S. Cl.
  CPC ..... *H04B 10/07955* (2013.01); *G02B 6/4246* (2013.01); *G02B 6/4269* (2013.01); *G02B 6/4286* (2013.01); *H04B 10/672* (2013.01)

(58) Field of Classification Search
  CPC ........... G01M 11/3145; G01M 11/335; G01M 11/33; G01M 11/3109; G01M 11/338
  (Continued)

(56) References Cited

U.S. PATENT DOCUMENTS

5,760,940 A * 6/1998 Frigo ................... H04B 10/035
  398/38
2013/0188176 A1* 7/2013 Lovely .................. G01D 5/353
  356/73.1

(Continued)

OTHER PUBLICATIONS

Cornelius et al., "Methods for Determining Receiver Coupling Efficiency, Link Margin, and Link Topology in Active Optical Cables", U.S. Appl. No. 14/885,000, filed Oct. 16, 2015.

*Primary Examiner* — Tarifur Chowdhury
*Assistant Examiner* — Md M Rahman
(74) *Attorney, Agent, or Firm* — Keating & Bennett, LLP

(57) ABSTRACT

A method for determining receiver coupling efficiency includes varying optical power inputted into a half active optical cable to determine a maximum optical power at which the TIA squelches and determining a receiver coupling efficiency by calculating a ratio of a threshold optical power to the maximum optical power at which the TIA squelches. A method of determining link loss in a channel includes varying optical power of a light source to determine the maximum optical power at which the TIA squelches and determining the link loss in the channel by subtracting the maximum optical power from the threshold optical power. A method of determining link topology includes selecting a pattern of optical powers and matching a pattern of squelched and non-squelched outputs with the pattern of optical power. An active optical cable includes memory storing a value related to an initial link loss of the active optical cable.

8 Claims, 14 Drawing Sheets

Related U.S. Application Data

(60) Provisional application No. 62/065,130, filed on Oct. 17, 2014.

(51) Int. Cl.
*G02B 6/42* (2006.01)
*H04B 10/67* (2013.01)

(58) Field of Classification Search
USPC ......................................................... 356/73.1
See application file for complete search history.

(56) References Cited

U.S. PATENT DOCUMENTS

| | | | | |
|---|---|---|---|---|
| 2014/0112626 A1* | 4/2014 | Galloway | ............ | G02B 6/4279 385/88 |
| 2014/0294353 A1* | 10/2014 | Ertel | .................... | G02B 6/4204 385/93 |

* cited by examiner

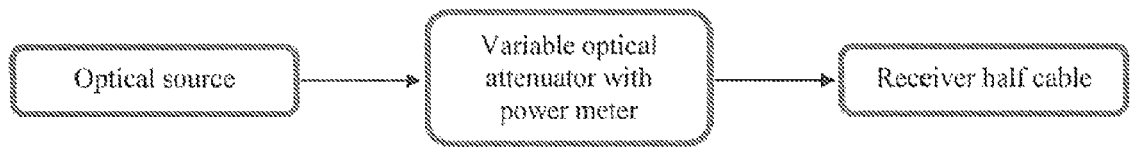
Fig. 1: Schematic for test to measure receiver coupling efficiency of a half cable
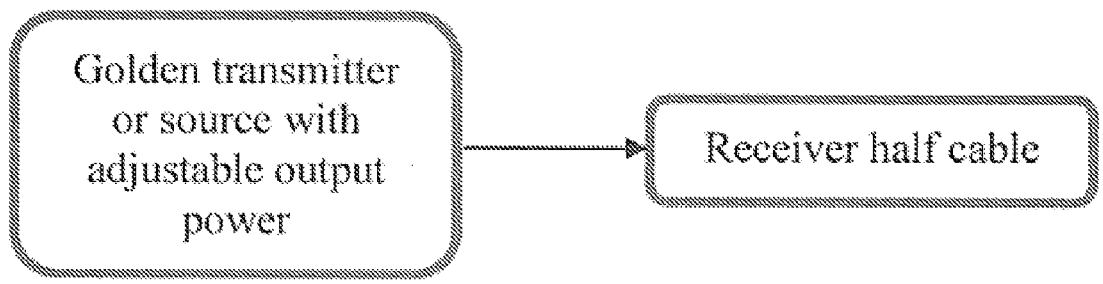
Fig. 2: Method for measuring receiver coupling efficiency of a half cable without an attenuator
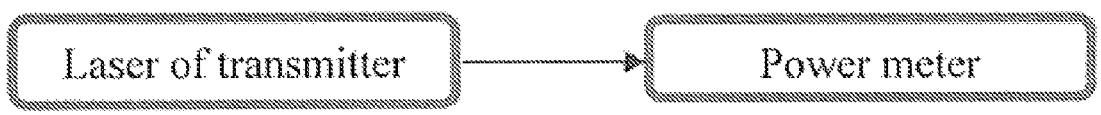
Fig. 3: Calibration step for performing link margin test

METHODS FOR DETERMINING RECEIVER COUPLING EFFICIENCY, LINK MARGIN, AND LINK TOPOLOGY IN ACTIVE OPTICAL CABLES

BACKGROUND OF THE INVENTION

1. Field of the Invention

The present invention relates to active optical cables (AOCs). More specifically, the present invention relates to methods for determining receiver coupling efficiency, link margin, and link topology in AOCs.

2. Description of the Related Art

An AOC is a fiber optic cable whose ends can be connected to at least one optical-to-electrical or electrical-to-optical converter, called an optical transducer. A fiber optic cable can have one or more strands of optical fibers. A full AOC includes a fiber optic cable with transducers on both ends, and a half AOC has a transducer on one end of a fiber optic cable, with the other end of the fiber optic cable connected to an optical connector. A full AOC can connect two electrical systems, e.g. two servers in a data center. A half AOC can connect an electrical system and an optical system. The end of the AOC contains the optical transducer so that the AOC can electrically transmit and receive data to and from the electrical systems while optically transmitting and/or receiving data through the fiber optic cable.

An AOC can either be uni-directional or bi-directional. A uni-directional AOC only transmits data in one direction, and a bi-directional AOC can transmit data in two directions. The AOC can contain a receiver that receives optical signals, a transmitter that transmits optical signals, or a transceiver that transmits and receives optical signals. A full uni-directional AOC includes a transmitter and a receiver. The transmitter receives electrical signals, converts the electrical signals into optical signals, and transmits the optical signals through the fiber optic cable to a receiver; and the receiver receives the optical signals from the fiber optic cable, converts the optical signals to electrical signals, and transmits the electrical signals. A full bi-directional AOC includes two transceivers to enable it to transmit and receive optical signals in two directions.

A full bi-directional AOC includes two transceivers to enable it to transmit and receive data in two directions. A full AOC is considered a closed link or system because the only optical signals transmitted by the fiber optic cables must be created by the two AOC ends that connect to the electrical connectors. A pair of half AOCs, either one transmitter and one receiver or two transceivers, can be mated together with an optical connector to form a closed link that can be opened. One reason to mate two half AOCs is to allow for increasing the length of the AOC by inserting an additional length of fiber optic cable.

In a receiver or in a receiving portion of a transceiver, the light exiting the fiber optic cable is directed to a photodetector. The photodetector has a known responsivity, which is typically expressed as an electrical current divided by the input optical power, i.e. A/W. The photodetector is connected to a transimpedance amplifier (TIA), which converts the current created by the light received by the photodetector to a voltage related to the amount of light incident on the photodetector. There are several types of TIAs, such as linear TIAs, limiting TIAs, and limiting TIAs with a received signal strength indicator (RSSI) output. For a linear TIA, the amount of light or optical power incident on the photodetector can be determined based on the linear TIA's known gain characteristic. The receiver coupling efficiency is the percentage of light exiting the optical fiber that the photodetector receives. Without a received signal strength indicator (RSSI) on a limiting TIA, the receiver coupling efficiency is difficult or impossible to measure. A focusing lens can be located between the end of the optical fiber and the photodetector. It is difficult or impossible to measure how well the optical fiber is aligned with the lens or how well the lens is aligned with the photodetector. This problem exists for both full and half AOCs.

In a transmitter or in a transmitting portion of a transceiver, electrical signals are converted into light by using a laser or some other light source, such as a light emitting diode (LED). Vertical-cavity surface-emitting lasers (VCSELs) can be used as the laser. The VCSELs can include an array of individually controlled lasers. The light from the laser is directed at the fiber optic cable. The transmitter coupling efficiency is the percentage of laser light entering the optical fiber. The optical fiber does not have a mechanism to indicate the amount of light that it receives. A lens can be located between the end of the optical fiber and the laser. It is difficult or impossible to measure how well the optical fiber is aligned with the lens or how well the lens is aligned with the laser for full AOCs. The optical coupling can be measured in a transmitter half AOC because the optical power that is coupled into the fiber can be detected using a commercial power meter.

Margin is the amount of loss a link can tolerate and still function properly. For example, if a transmitter puts out −1 dBm of power and if the receiver requires at least −10 dBm of power to function properly, then 9 dB of power loss between the transmitter and the receiver can be tolerated. Coupling efficiency and attenuation in the optical fiber will make up part of that 9 dB of power, and the rest is margin. The amount of margin cannot be measured in a closed link in which a full AOC or mated pair of AOCs are used because the receiver coupling efficiency can only be measured using half AOCs. Further, the receiver and transmitter coupling efficiency cannot be measured in a closed link of either a full AOC or a mated pair of half AOCs.

The power in the optical fiber and the power that reaches the photodetector are needed to determine the receiver coupling efficiency. Before mating a half AOC in a mated pair of AOCs, it is possible to measure the power in the optical fiber of the unmated half AOC. However, the receiver coupling efficiency cannot be determined because the power that actually reaches the photodetector cannot be determined.

The margin cannot be measured in full AOCs because it is a closed link with no additional connectors. There is an unknown transmitting coupling efficiency between the laser and the optical fiber on the transmitter. The amount of light that is in the optical fiber at the receiver is also unknown, which makes it impossible to know the receiver coupling efficiency between the fiber and the photodetector that is inside the receiver.

The margin cannot be measured in mated pairs of half AOCs, where there is an optical connector that mates the two half AOCs. To determine the amount of light that is coupled into the receiver, the optical power emitted by the laser, the transmission of the optical connection between the two half AOCs, and the coupling from the fiber after the connection in the receiver must be known. However, there is no currently known method to determine how much light actually reaches the receiver, which is the value that is of most concern.

The use of AOCs in systems can have many different optical fibers and connections placed between the two half AOCs. There is no known method to determine how much margin is in a link after the AOCs have been installed; the link simply functions or it does not.

It is possible to use eye-quality tests that can give a qualitative measurement of link margin, but eye-quality tests only provide a rough estimate of link margin. The bit-error rate can be measured by adjusting the optical power using an optical attenuator and measuring the frequency of errors as a function of the optical power. However, the bit-error-rate measurement is time consuming and can only be performed on half AOCs. Bit-error-rate measurement cannot be performed on full AOCs because bit-error rate measurement requires that the output power of the transmitter be adjusted to known levels while maintaining RF performance. While it is possible to change the drive current of the laser, which will adjust the transmitted power, it is difficult to change the drive current while transmitting a signal.

Some TIAs have an integrated RSSI function that measures the current emitted by the photodetector. However, not all TIAs have an integrated RSSI function. Without an integrated RSSI function in a limiting TIA, the photodetector current cannot be measured by the TIA. Because the current cannot be measured, it is not possible to determine how much light is being received by the photodetector.

In systems with numerous links, the topology of the links can be difficult to determine.

SUMMARY OF THE INVENTION

To overcome the problems described above, preferred embodiments of the present invention provide methods for determining receiver coupling efficiency, link margin, and link topology in AOCs.

A preferred embodiment of the present invention provides a method for determining receiver coupling efficiency of a half active optical cable that includes a photodetector and a transimpedance amplifier connected to an output of the photodetector, wherein the transimpedance amplifier squelches its output when optical power incident on the photodetector is below a threshold optical power, the method including varying optical power inputted into the half active optical cable to determine a maximum optical power at which the transimpedance amplifier squelches its output and determining a receiver coupling efficiency by calculating a ratio of the threshold optical power to the maximum optical power at which the transimpedance amplifier squelches its output.

The optical power can be decreased until the transimpedance amplifier squelches its output or increased until the transimpedance amplifier stops squelching its output. The transimpedance amplifier preferably provides a squelch signal when the transimpedance amplifier squelches its output. The step of varying the optical power preferably includes using a variable optical attenuator, using one or more golden transmitters, or varying optical power of a light source by varying the bias current. The threshold optical power is preferably calculated based on characteristics of the photodetector and the transimpedance amplifier.

A preferred embodiment of the present invention includes a method of determining link loss in a channel of a full active optical cable, the method including assembling the full active optical cable with a channel that includes a light source, a photodetector optically connected to the light source, and a transimpedance amplifier connected to an output of the photodetector, wherein the transimpedance amplifier squelches its output when optical power incident on the photodetector is below a threshold optical power; during the assembling of the full active optical cable, determining optical power of the light source as a function of bias current; after the assembling of the full active optical cable, varying optical power of the light source to determine a maximum optical power of the light source at which the transimpedance amplifier squelches its output; and determining link loss in the channel by subtracting the maximum optical power of the light source at which the transimpedance amplifier squelches its output from the threshold optical power.

The step of determining output power of the light source as a function of current preferably includes varying a bias current of the light source and measuring optical power of the light source as a function of the bias current prior to assembly of the light source in the active optical cable. The step of varying the bias current preferably does not include applying a radio frequency signal to the bias current. The link loss is preferably used as a quality assurance gate after the assembling of the full active optical cable. The photodetector is preferably optically connected to the light source by a fiber optic cable.

A preferred embodiment of the present invention provides a method of determining link loss in a channel of a full active optical cable that includes a light source, a photodetector optically connected to the light source, and a transimpedance amplifier connected to an output of the photodetector, wherein the transimpedance amplifier squelches its output when optical power incident on the photodetector is below a threshold optical power, the method including varying optical power of the light source to determine a maximum optical power of the light source at which the transimpedance amplifier squelches its output; and determining link loss in the channel by subtracting the maximum optical power of the light source at which the transimpedance amplifier squelches its output from the threshold optical power.

Preferably, the optical power of the light source is a known function of a bias current of the light source, and the step of varying optical power of the light source includes varying the bias current of the light source to produce a known optical power.

A preferred embodiment of the present invention includes an active optical cable including a light source; a photodetector optically connected to the light source; and a transimpedance amplifier connected to an output of the photodetector, wherein the transimpedance amplifier squelches its output when optical power incident on the photodetector is below a threshold optical power; and memory used to store a value related to an initial link loss of the active optical cable.

The active optical cable further preferably includes a processor connected to the memory, wherein the memory stores the threshold optical power, and optical power values of the light source as a function of bias current and wherein the processor calculates link loss by varying optical power of the light source to determine a maximum optical power of the light source at which the transimpedance amplifier squelches its output and determining link loss by subtracting the maximum optical power of the light source at which the transimpedance amplifier squelches its output from the threshold optical power.

The processor preferably calculates a change in link loss by subtracting the original link loss from the determined link loss. The memory is preferably included in the processor.

The processor preferably varies the optical power of the light source by varying a bias current of the light source to produce a known optical power based on the optical power values stored in the memory.

A preferred embodiment of the present invention provides a method of determining link topology of a system of active optical cables, wherein each of the active optical cables includes channels and each of the channels includes a light source, a photodetector optically connected to the light source, and a transimpedance amplifier connected to an output of the photodetector, wherein the transimpedance amplifier squelches its output when optical power detected by the photodetector is below a threshold optical power, the method including selecting a pattern of optical powers of the light sources in a transmitter to be either above the threshold optical power or below the threshold optical power and determining which receiver is connected to the transmitter by matching a pattern of squelched and non-squelched transimpedance amplifier outputs in the receiver with the pattern of optical power of the light sources in the transmitter.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIG. 1 is a schematic for a test to measure the receiver coupling efficiency of a half AOC.

FIG. 2 shows a method for measuring receiver coupling efficiency of a half AOC without an attenuator.

FIG. 3 shows a calibration step for performing a link margin test.

DETAILED DESCRIPTION OF PREFERRED EMBODIMENTS

Figure 4:
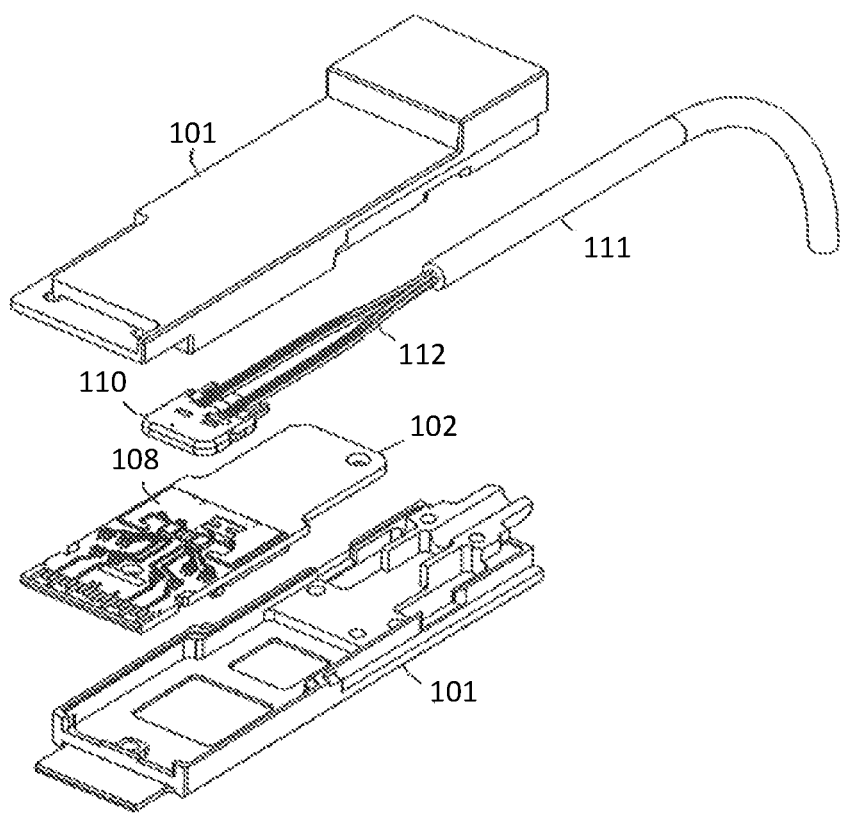
FIG. 4 is an exploded view of an AOC.

The preferred embodiments of the present invention provide methods for determining receiver coupling efficiency, link margin, and link topology in AOCs. The methods of the preferred embodiments are grouped into the following subsets:

1) a test that can be used to measure the receiver coupling efficiency of half AOCs;
2) a test that can be used to measure the link margin for closed links with full AOCs or mated pairs of half AOCs; and
3) a test that can be used to determine which receiver is mated to a given transmitter to determine link topology.

Receiver Coupling Efficiency

The receiver coupling efficiency can be measured using a method according to a preferred embodiment of the present invention by injecting a known amount of optical power and by recording when the TIA goes into squelch.

Optical signals are typically transmitted as digital signals, i.e., as zeros and ones. Optical zero signals are transmitted at a reduced power level, e.g. 50% of the power level for an optical one signal, but not at a zero power level. A zero power level means that no optical signals are being transmitted, not that an optical zero signal is being transmitted.

In the receiver or the receiving portion of a transceiver, the TIA is connected to the output of the photodetector. The TIA's output is squelched or suppressed unless the photodetector's average output is above a certain threshold level. For example, when an AOC is not intended to be transmitting, the AOC may transmit noise signals that are not data, i.e. not ones and zeroes. If the TIA output is not suppressed or squelched, then a noise signal can be incorrectly considered data likely leading to system errors.

Most TIAs used in receivers have this squelch feature. The TIA squelches the photodetector's output when the photodetector is producing too little current because of low optical power received by the photodetector. Using squelch to determine the receiver coupling efficiency has the benefits of being able to be used with both full and half AOCs and being extremely time efficient. The coupling efficiency test can be run very quickly without use of complex and expensive high speed modulation equipment. Because the squelch feature is a standard feature in the TIAs used in most receivers, no additional hardware or functionality is needed in the receiver.

The method for determining the receiver coupling efficiency of a receiver of a half AOC relies on adjusting the optical input power until the receiver changes whether or not the TIA's output is squelched. The optical input power can be decreased until the TIA's output is squelched, which would be a change from not squelching to squelching. Alternatively, the optical input power can be increased until the TIA's output is no longer squelched, which would be a change from squelching to not squelching. The maximum input optical power that causes squelch can be determined when the TIA's output changes from not squelching to squelching or when the TIA's output changes from squelching to not squelching. In a similar manner, the minimum input optical power that does not cause squelching can also be determined. FIG. 1 shows a non-limiting example of a method for determining the receiver coupling efficiency.

For example, the receiver coupling efficiency can be measured by decreasing the receiver's input optical power using a variable optical attenuator until the TIA squelches the output. When the TIA squelches the output, the TIA provides a squelch signal or flag to indicate that the TIA's output has been squelched. The squelch signal makes it easier to determine that that the output is squelched by allowing a data zero signal to be differentiated from a squelched output. The detection of the squelch signal allows the receiver's coupling efficiency to be determined because the output is squelched at a known level of input optical power incident on the photodetector. Alternatively, instead of decreasing the input optical power, the input optical power can be increased, until the TIA stops providing the squelch signal.

If the TIA's threshold squelch level is adjustable, then it is preferred to set the threshold squelch level to its highest level. The highest threshold squelch level corresponds to the most input optical power, which allows for the most accurate measurement. If the TIA's threshold squelch level is not adjustable, then the TIA squelches at a fixed input optical power.

By knowing, for example, the photodetector's responsivity, the TIA's gain characteristics of a linear TIA or the RSSI of a limiting TIA, and the TIA's threshold squelch level, the optical power incident on the photodetector that is required to trigger squelch in the TIA can be calculated. The coupling efficiency is determined by taking the ratio of the known calculated input optical power that triggers squelch to the maximum input optical power that yields squelch.

FIG. 2 shows another method for determining the receiver coupling efficiency. This method does not use an optical attenuator and requires either using a golden transmitter with a known power level or calibrating the optical source to a known power level by adjusting the bias current in software and recording the output power level prior to be measuring the coupling efficiency. Then, whether or not the known power level causes the TIA to squelch the output is recorded. The power level can be increased or decreased by providing a different golden transmitter or by adjusting the bias current. When the power level drops below the squelch threshold level, the TIA squelches its output and provides the squelch signal, and the power level is recorded. Alternatively, the power level may be increased until the squelch signal is not provided and the power level is recorded.

Using the preferred methods of the present invention is more time efficient than bit-rate-error measurement discussed above. Because these preferred methods of the present invention do not require optical signal modulation and can use a constant optical power instead of RF modulated optical power, these preferred methods of the present invention have much more flexibility in the range of optical powers that can be achieved without the need to maintain an RF performance level required in a bit-rate-error measurement. The squelch signal is dependent on the level of constant or average optical input power. Disabling the modulation does not inhibit the ability to measure the amount of light reaching the receiver, but does allow better control over the output power of the optical source or transmitter.

Link Margin

Figure 5A:
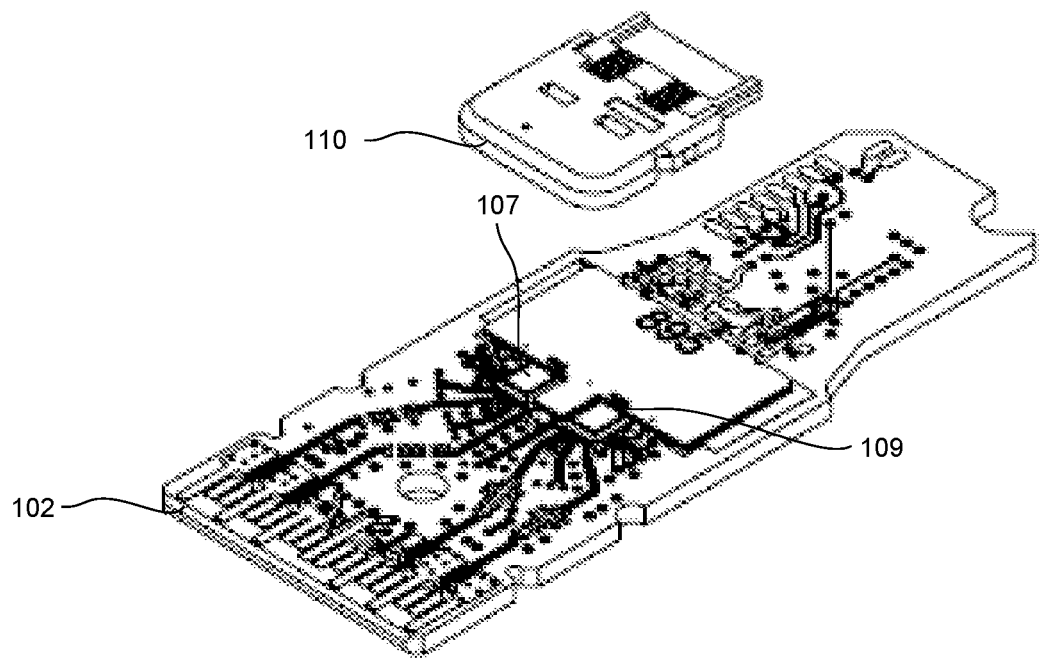
FIG. 5A is an exploded top view of a printed circuit board and a molded optical structure for a transceiver.

The total link loss can be measured using a method according to a preferred embodiment of the present invention by knowing the output power of the laser as a function of the injected current. This measurement requires that an initial calibration test be performed before the lens is mounted adjacent to the laser. This test may be performed when the VCSEL is mounted to the PCB 102 but before the molded optical structure 110 is installed as seen in FIG. 5A. An integrating sphere can be placed in proximity to each laser in the VCSEL array. The integrating sphere captures the light emitted from the VCSEL so that the total output optical power can be recorded as a function of bias current. The total link loss measurement can be performed on closed links with full AOCs or mated pairs of half AOCs. The total link loss is related to how much loss is in the link, while the margin is related to how much additional loss can be tolerated in the link while still functioning properly.

Because this method can be used in all closed links, including full AOCs, it can be used as a diagnostic tool to ensure proper link performance. This method can be implemented as a firmware tool to allow the determination of the link margin. For example, in a system that uses several links, it is desirable to know the amount of margin in each link without disturbing the links. Using this method provides a diagnostic tool that can determine the amount of margin that is available for each link without any physical intervention. This method can be used during initial system setup of the links or can be used to monitor the link health over time.

In a closed system with either a full AOC or a mated pair of half AOCs, measuring for link margin requires two steps:
1) transmitter calibration; and
2) the link margin measurement.

The calibration step is used to measure and record the bias current that is required to achieve the desired power level. FIG. 3 shows the calibration step. The calibration step is preferably performed during manufacturing of the AOC before the focusing lens is attached to the transmitter. The light from the laser is emitted into free space and captured by an integrating sphere. The optical output power as a function of bias current measured using the integrating sphere is recorded and stored for future use. After the calibration step is performed, the emitted power as a function of bias current can be saved in a lookup table in the AOC's firmware, which can be stored, for example, in the microprocessor 103 shown in FIG. 5B and/or in manufacturing test equipment used in the manufacturing of the AOC.

The second step is the link margin measurement can be performed after the AOC is manufactured. For a full AOC, the optical power can no longer be adjusted by a variable optical attenuator because it is a closed link. Instead, the optical power can be adjusted to known power levels by changing the amount of current that drives the laser on the transmitter. The current that is required to achieve the desired power level is stored in the AOC's firmware during the calibration step. The total link loss can be calculated by subtracting the calculated optical power based on the characteristics of the photodetector and the TIA at which the receiver squelches from the maximum optical power from the transmitter at which the receiver squelches. The initial link margin of the AOC may be determined using the initial power level and the power level that causes the TIA to squelch. For the AOC link to function, the receiver requires a certain minimum power level, referred to as the Rx sensitivity. The Rx sensitivity can be proportional to the power level that causes the TIA to squelch. Thus, the initial link margin can be determined by knowing the initial AOC power level, the power level that causes the TIA to squelch, and the proportionality between the Rx sensitivity and the power level that causes the TIA to squelch.

The link margin test can be used in manufacturing in quality assurance to ensure sufficient link margin in any product sold. A quality assurance gate can be established such that an active optical cable must have sufficient link margin to pass the quality assurance gate. The link margin test can also be used as a diagnostic self-test on installed AOCs. The maximum optical power at which the receiver squelches can be measured by adjusting the output optical power to known power levels that are saved in the AOC's firmware during the calibration step. Based on the maximum optical power, it will be evident if the AOC has degraded and needs to be replaced.

For example, at an initial time, 1 mW of optical power is determined to be the maximum optical power at which the output is squelched, and at a later time, 2 mW of optical power is determined to be the maximum optical power at which the output is squelched. Then, it can be determined that the AOC has degraded such that 1 mW of power has been lost. This represents a 50% reduction in power or a decrease of 3 dB in the link margin. The optical powers can equivalently be expressed in dBm. In this example, the initial optical power is 0 dBm (1 mW), and the final optical power is 3 dBm (2 mW). So the link loss is 3 dB.

Storing the initial link loss, or a related quantity, of the AOC in its memory facilitates using the AOC. Many AOCs can be integrated into complex computer and communication systems. Using the methods described above, these systems can interrogate any channel of any AOC in the system to determine its current link loss. Because the initial link loss has been stored in memory, the initial link loss can be compared with the current link loss, indicating possible degradation of the link margin. This information can be used in debugging the system and proactively replacing any AOC that appears to be failing.

Link Topology

This method can also be used to determine which transmitter and receiver are mated to each other. In a system with numerous AOCs, it is sometimes difficult to determine which transmitter is connected to which receiver. In such a system, each of the numerous AOCs includes a transmitter and a receiver connected by an optical cable. The AOCs also include multiple channels between the transmitter and the receiver, with each channel including a laser in the transmitter and both a photodetector and a TIA in the receiver. By using squelch, it is possible to determine which transmitter is connected to a given receiver by having each transmitter enable a unique number and orientation of lasers. All channels of the AOC will be squelched on the mating receiver except for those that the transmitter has enabled. As a result, it is possible to deduce which transmitters and receivers are connected to one another. If there are more links than the number of possible unique patterns, then the method can be performed sequentially on subsets of the mated transmitter/receiver pairs.

For example, suppose a system has a large number of multi-channel AOCs, and each transmitter is connected to a corresponding receiver. It is possible to enable a unique pattern of un-squelched channels on each transmitter so that the receiver with the identical pattern of un-squelched channels will be mated to the transmitter with the unique pattern of un-squelched channels. In an AOC with 12 channels, the outer two channels (the first and twelfth channels) of the transmitters can be un-squelched. Then, there will be no optical power reaching the middle ten channels of the corresponding receiver so that these middle ten channels should be squelched. On another transmitter/receiver pair, a different unique pattern can be used, e.g. the first and second channels could be un-squelched to determine that a transmitter and receiver pair is mated. Thus, it is possible to provide 4096 ($=2^{12}$) unique patterns for AOCs with 12 channels.

As another example, suppose the system includes a large number of bi-directional AOCs, including, for example, QSFPs with four channels for receiving and four channels for transmitting. Bi-directional AOCs include connected host and target transceivers. Then, it is possible to provide a unique pattern of un-squelched channels on both the host and the target transceivers. Thus, it is possible to provide 256 ($=2^8$) unique patterns for AOCs with four bi-directional channels. If the system contained 500 total links, then the topology can be mapped in two steps: first, 256 of the 500 links can be mapped, and second, the final 144 links can be mapped.

The preferred methods of the present invention discussed above can be applied to the AOCs shown in FIGS. 4-25. The AOCs shown in FIGS. 4-25 are examples of the AOCs that can be used with the preferred methods of the present invention; however, it is possible to use other AOCs.

Devices Implementing the Methods of the Preferred Embodiments of the Present Invention The methods of the preferred embodiments can be implemented in any suitable AOCs, examples of which are shown in FIGS. 4-25.

Figure 5B:
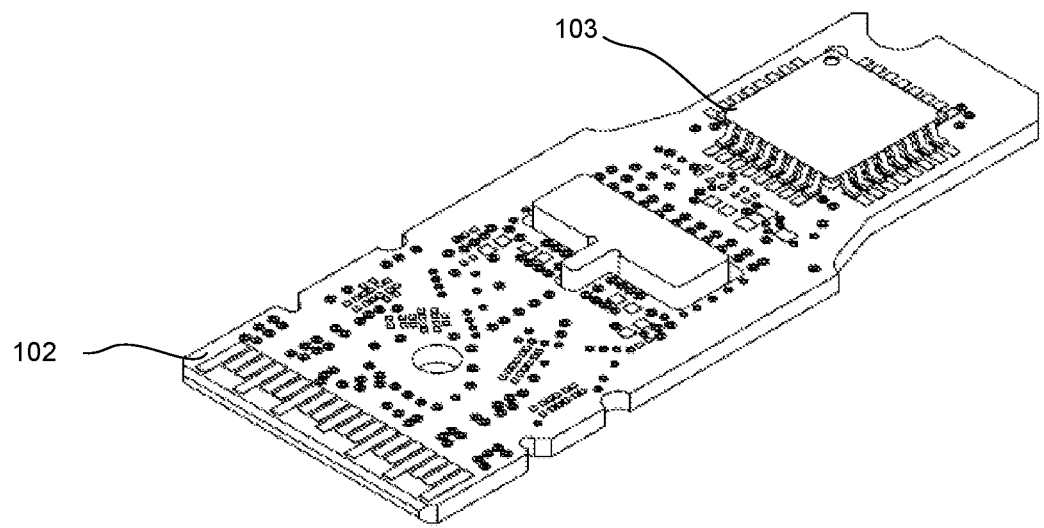
FIG. 5B is a bottom view of the printed circuit board shown in FIG. 5A.

FIGS. 4-5B show a bi-directional AOC with a transceiver that can both receive optical signals and transmit optical signals. As shown in FIG. 5A, the bi-directional transceiver includes both a photodetector 107 that can receive optical signals and a VCSEL 109 that can transmit optical signals. The transceiver includes a housing 101, an optical cable 111 with optical fibers 112, a substrate 102, a molded optical structure (MOS) 110 that couples or connects to the substrate 102 and to the optical fibers 112, and an optical riser 108. The substrate 102 includes a photodetector 107, a VCSEL 109, and a microprocessor 103. As shown in FIGS. 5A and 5B, the photodetector 107, the VCSEL 109, and the microprocessor 103 can be located on opposite surfaces of the substrate 102. It is also possible that the photodetector 107, the VCSEL 109, and the microprocessor 103 are located on the same surface of the substrate 102.

Figure 6:
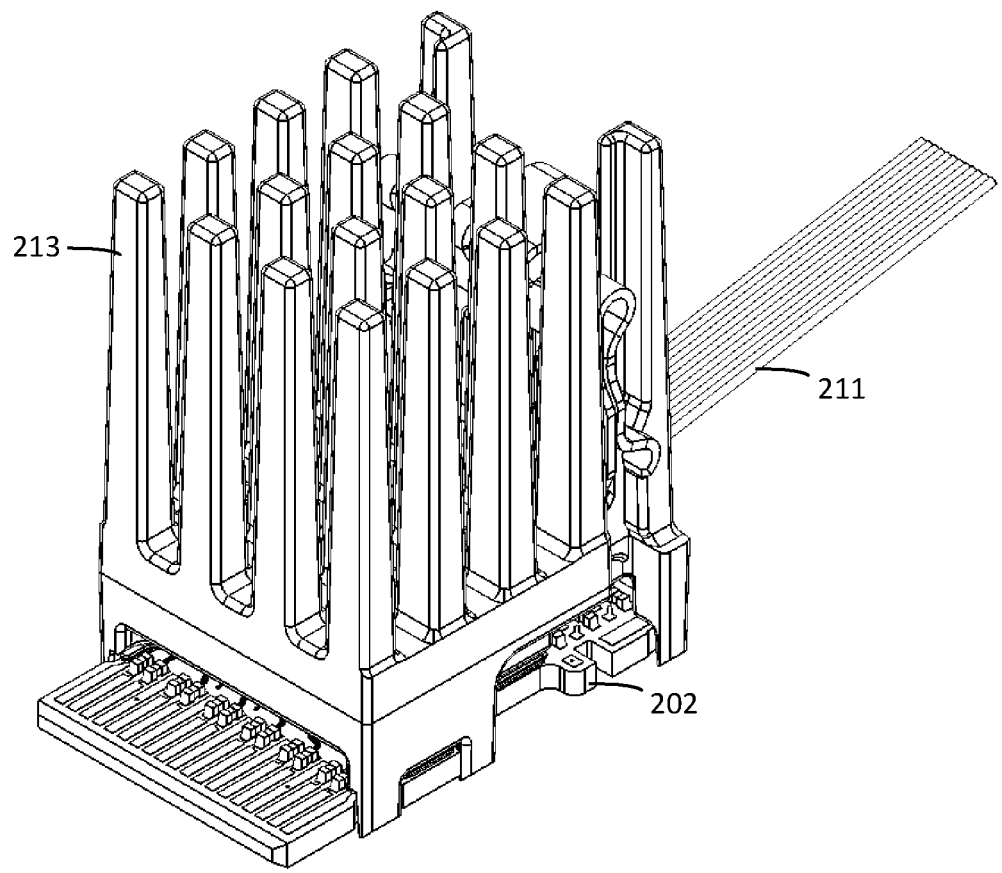
FIG. 6 is a perspective view of an AOC.
Figure 7:
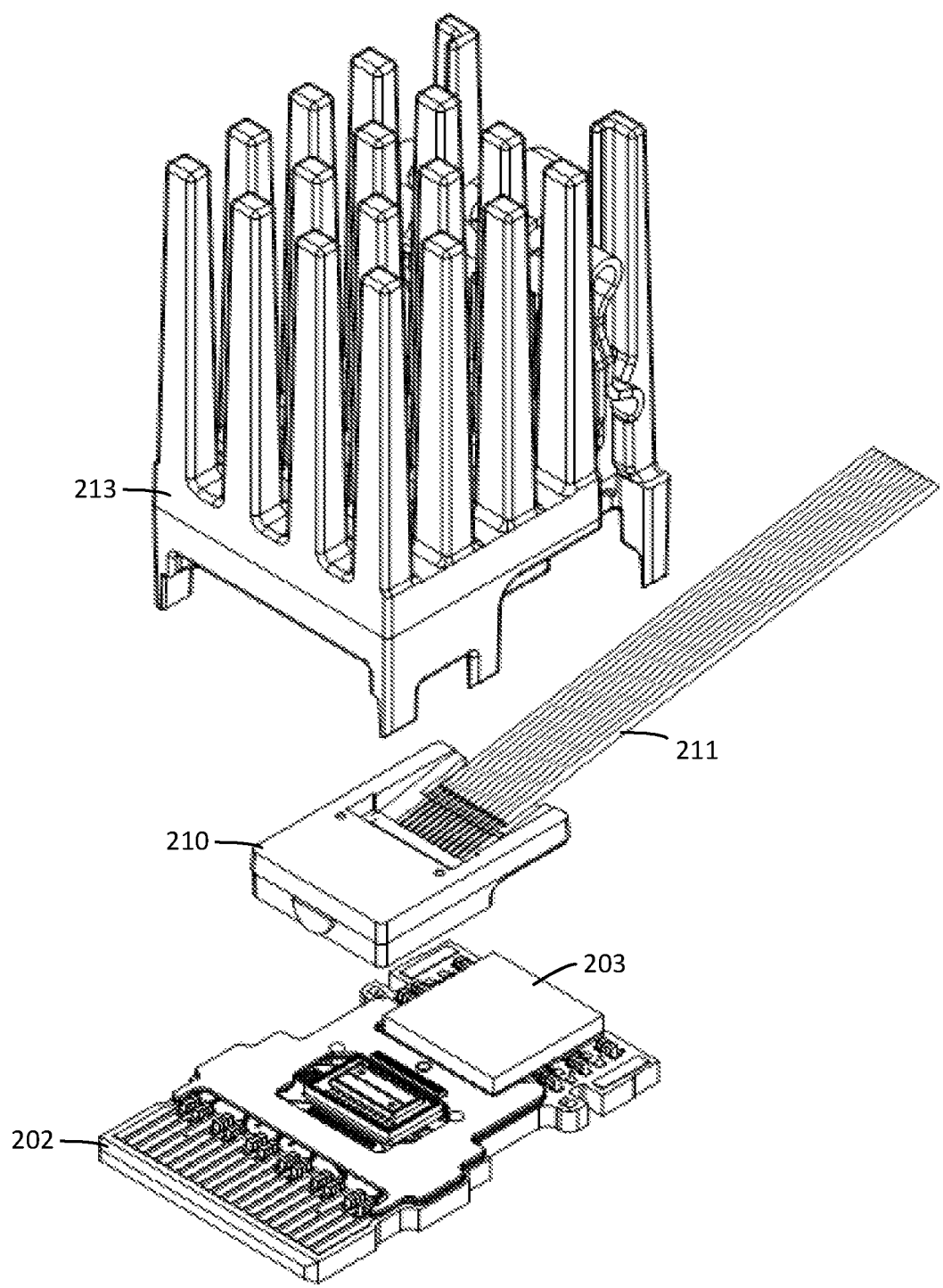
FIG. 7 is an exploded view of the AOC shown in FIG. 6.
Figure 8A:
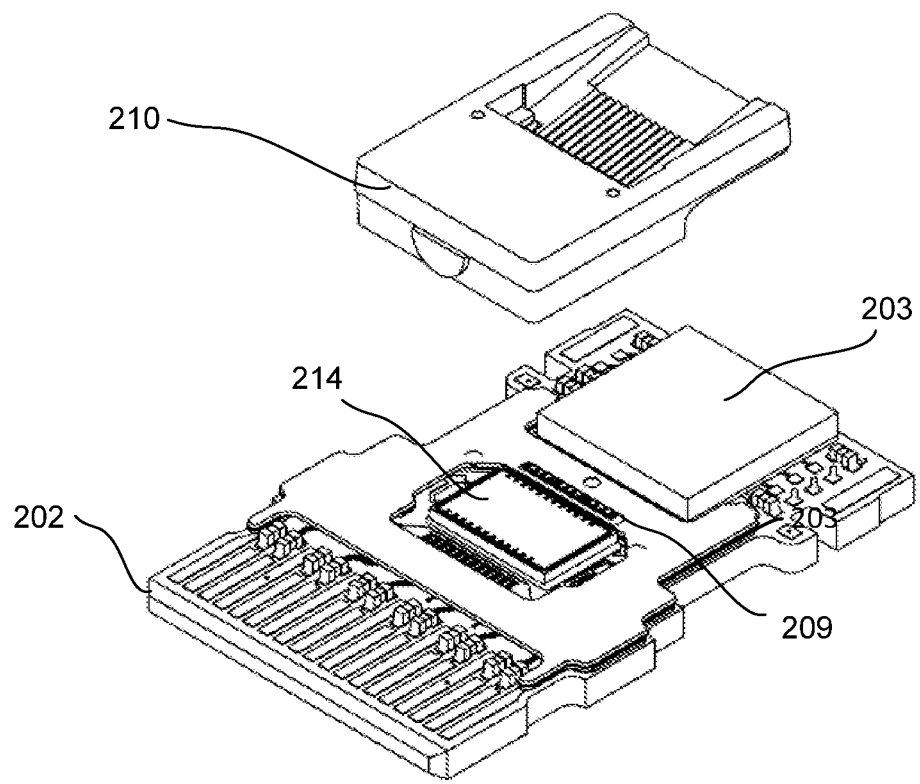
FIG. 8A is an exploded view of a printed circuit board and a molded optical structure of a transmitter that can be used with the AOC shown in FIG. 7.
Figure 8B:
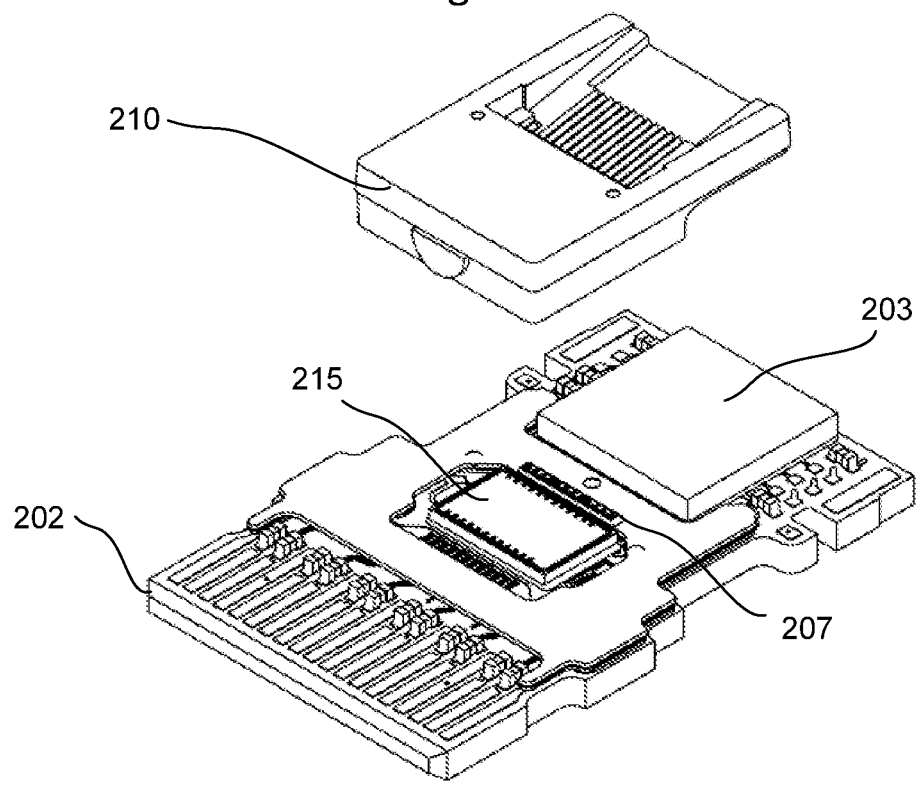
FIG. 8B is an exploded view of a printed circuit board and a molded optical structure of a receiver that can be used with the AOC shown in FIG. 7.

FIGS. 6-8B show a uni-directional AOC that can either receive optical signals or transmit optical signals. FIG. 8A shows a transmitter with a VCSEL and a driver. FIG. 8B shows a receiver with a photodetector and a TIA.

FIGS. 6 and 7 shows a device that can be a transmitter, a receiver, or a transceiver depending on the components included on the substrate 202. The device includes an optical cable 211, a substrate 202, a MOS 210 that couples or connects to the substrate 202 and to the optical fibers 212, a microprocessor 203, and an optional heatsink 213. As shown in FIG. 8A for a transmitter, the substrate 202 includes a driver 214, a VCSEL 209, and a microprocessor 203. As shown in FIG. 8A for a receiver, the substrate 202 includes a TIA 215, a photodetector 207, and a microprocessor 203.

Although microprocessors 103, 203 are shown in FIGS. 5B and 7-8B, any suitable computing or processing devices can be used, such as a microprocessor or FPGA (field programmable gate array). The microprocessors 102, 203 can be programmed to be used to implement the methods discussed above.

To determine a receiver's coupling efficiency, the receiver's microprocessor can be programmed to record or indicate when the TIA provides the squelch signal indicating that the output has been squelched.

To determine the total link loss, the results of the calibration step, i.e., a table of the optical output power as a function of bias current, can be stored in the microprocessor if the microprocessor has dedicated memory or a memory connected to the microprocessor. The microprocessor can be programmed to determine the total link loss by adjusting the amount of bias current driving the laser to determine the maximum optical power at which the receiver squelches.

The microprocessor can calculate the total link loss by subtracting the calculated optical power based on the characteristics of the photodetector and the TIA at which the receiver squelches from the maximum optical power from the transmitter at which the receiver squelches. The link loss or some related value such as link margin, the squelch threshold bias current, etc. can be stored in memory.

To determine link topology in a system with numerous AOCs, the microprocessor of each of the transmitters can be programmed to select a pattern of bias currents for the lasers so that the optical power of some channels is above the squelch threshold and so that the optical power of other channels is below the squelch threshold. And the microprocessor of each of the receivers can be programmed to provide the pattern of squelched and non-squelched channels so that the topology of the AOCs can be determined by matching the patterns of bias currents to the patterns of squelched and non-squelched channels.

Figure 9:
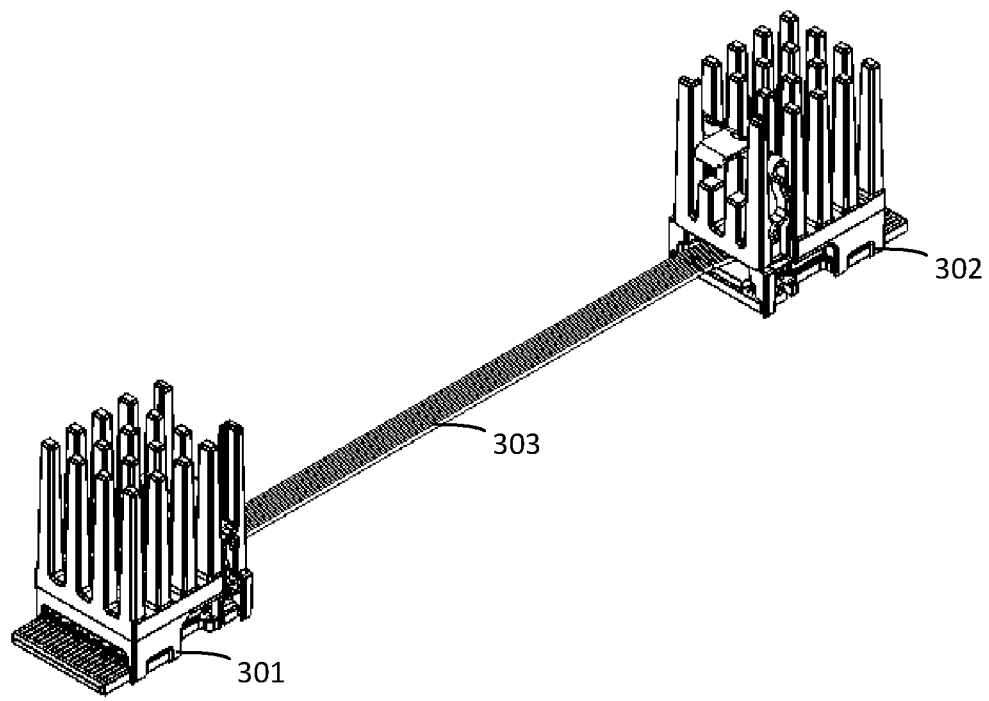
FIG. 9 is a top perspective view of a full AOC.
Figure 10:
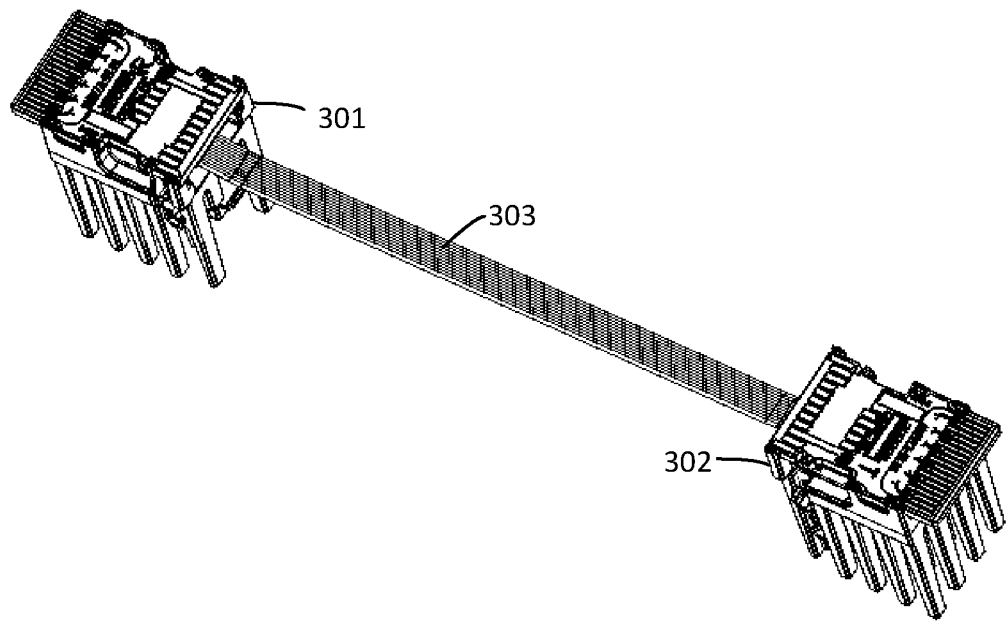
FIG. 10 is bottom perspective view of the full AOC shown in FIG. 9.
Figure 11:
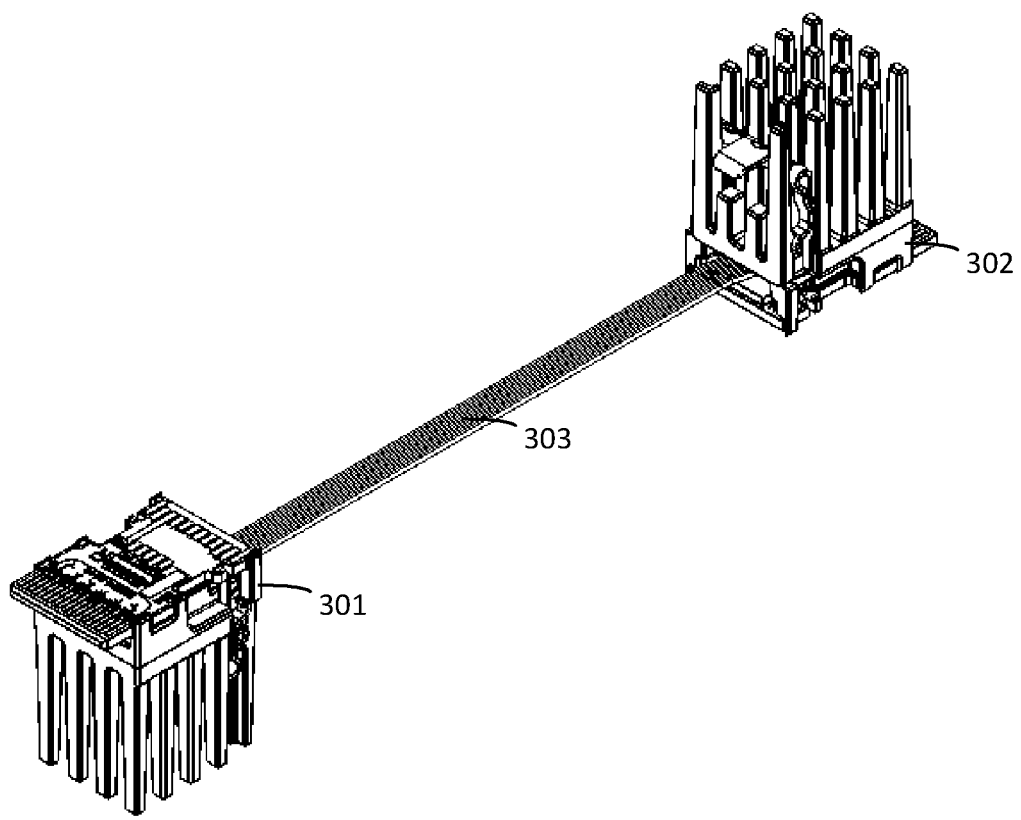
FIG. 11 is a top perspective view a looped full AOC.

FIGS. 9-11 show full AOCs, and FIGS. 12-25 show half AOCs. The AOCs shown in FIGS. 9-25 show specific electrical-to-optical connectors and specific optical connectors; however, other electrical-to-optical connectors and optical connectors can be used.

FIGS. 9 and 10 show top and bottom of a standard full AOC that includes two ends 301, 302 connected by an optical cable 303. The two ends 301, 302 can be a receiver and a transmitter or can be two transceivers. The ends 301, 302 are similar to device shown in FIG. 6, but other receivers, transmitters, or transceivers can also be used. FIG. 11 shows a looped AOC in which one of the ends 301, 302 is inverted with respect to the other end 302, 301.

Figure 12:
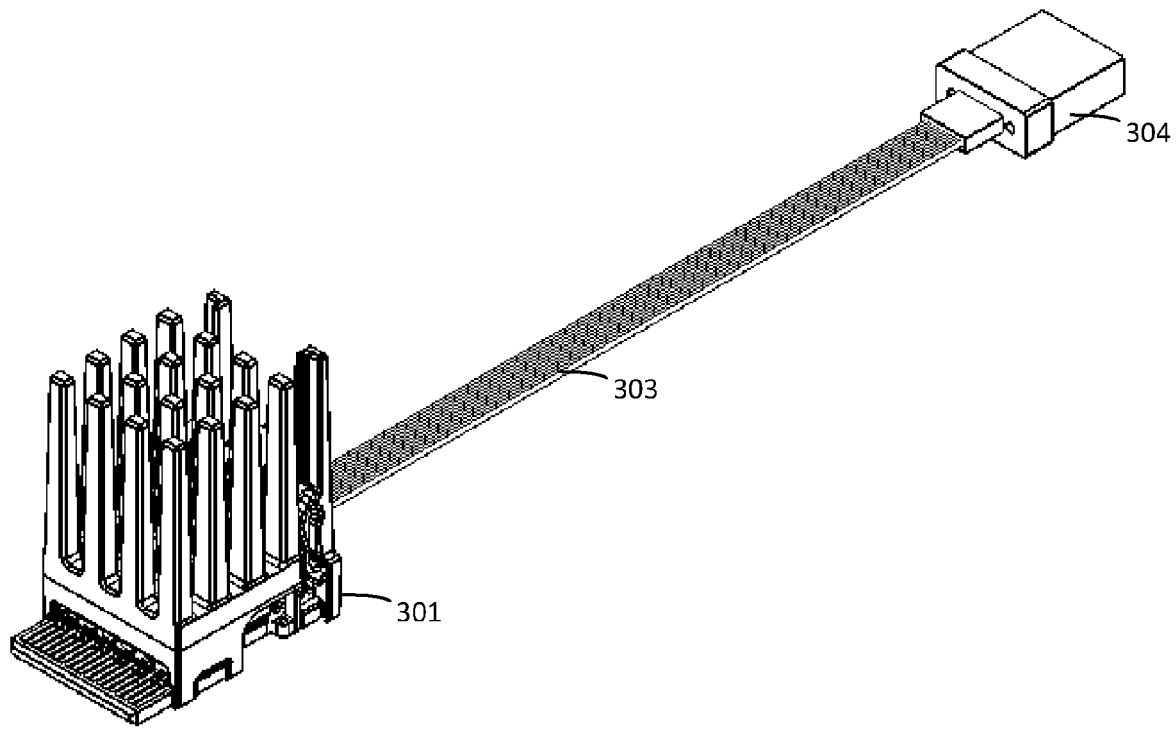
FIGS. 12-23 are top and bottom views of half AOCs.
Figure 13:
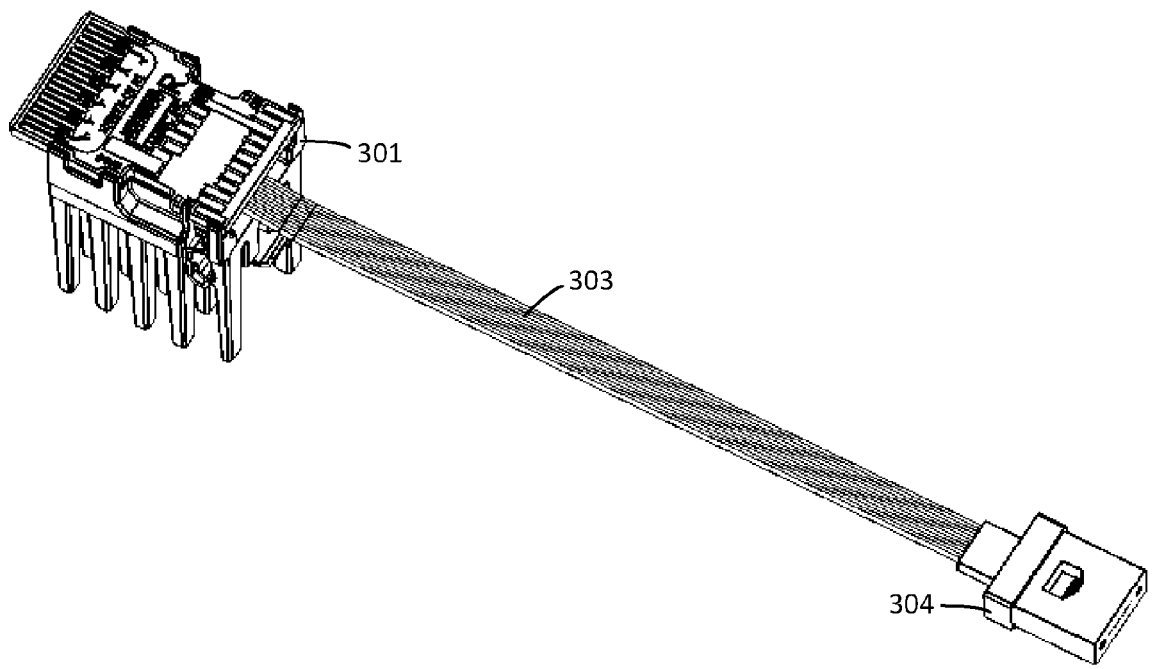
Figure 14:
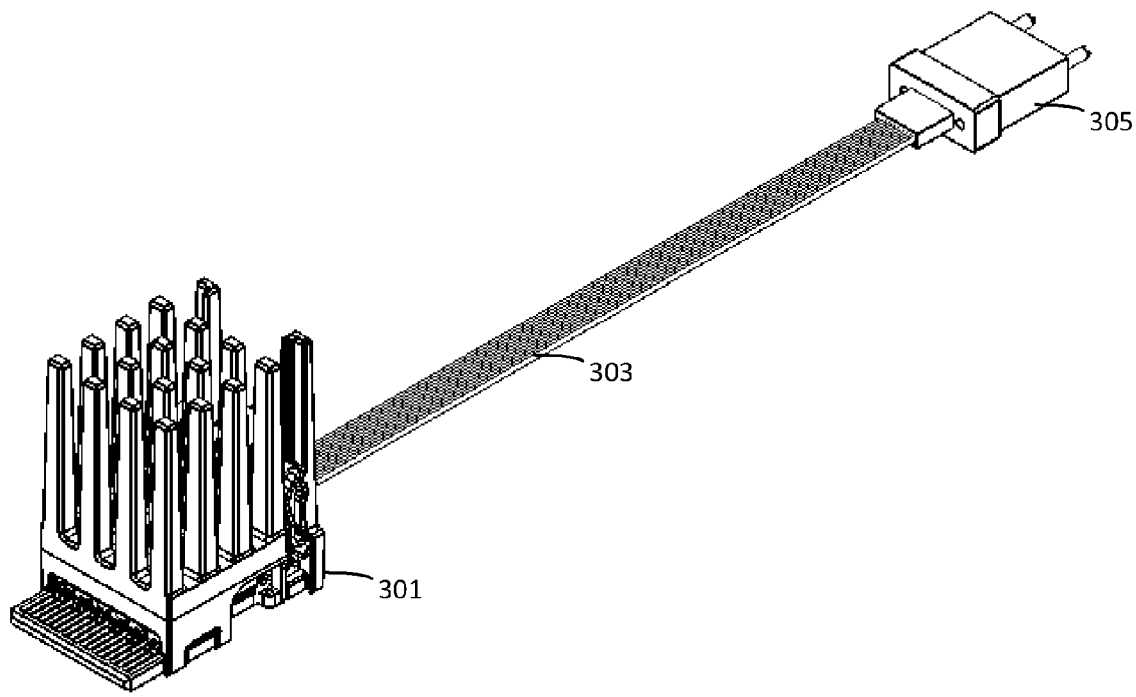
Figure 15:
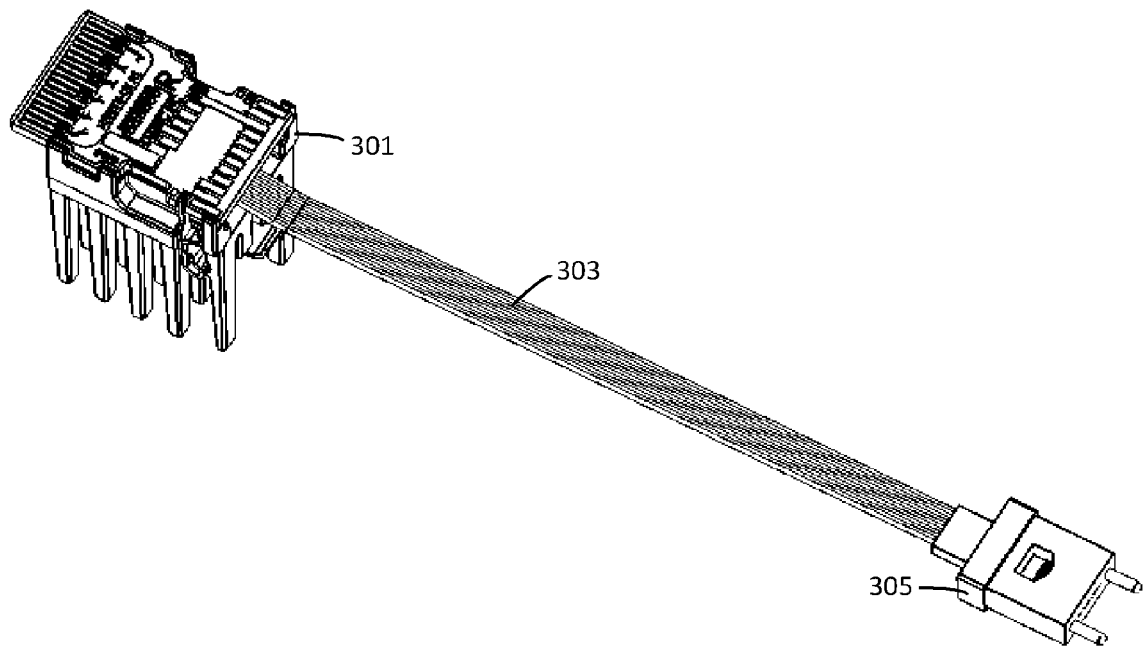
Figure 16:
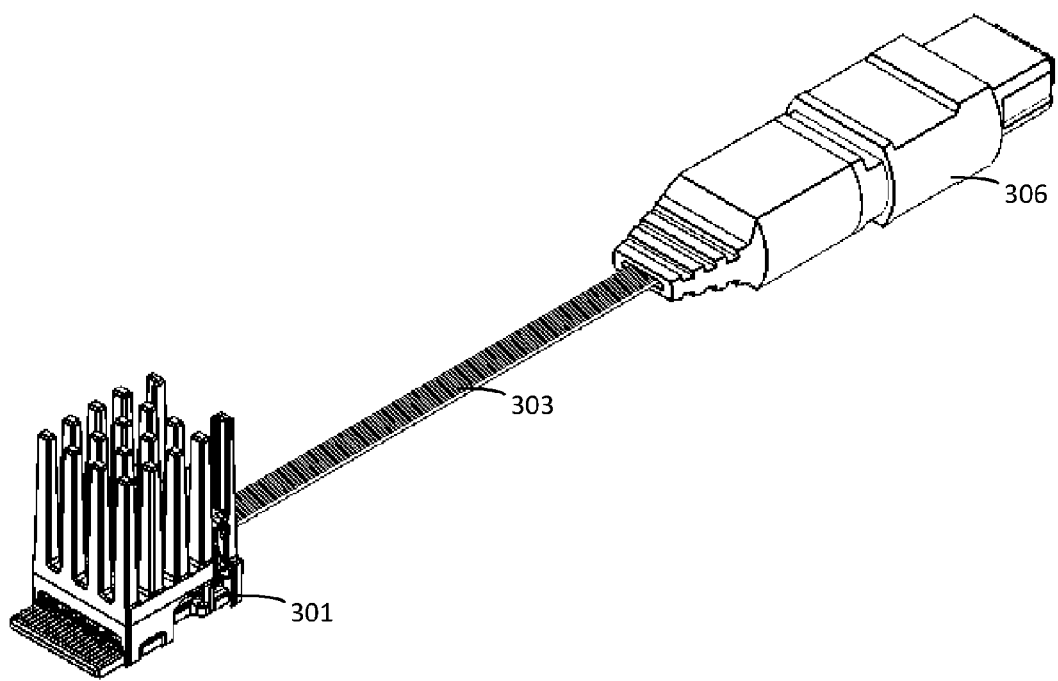
Figure 17:
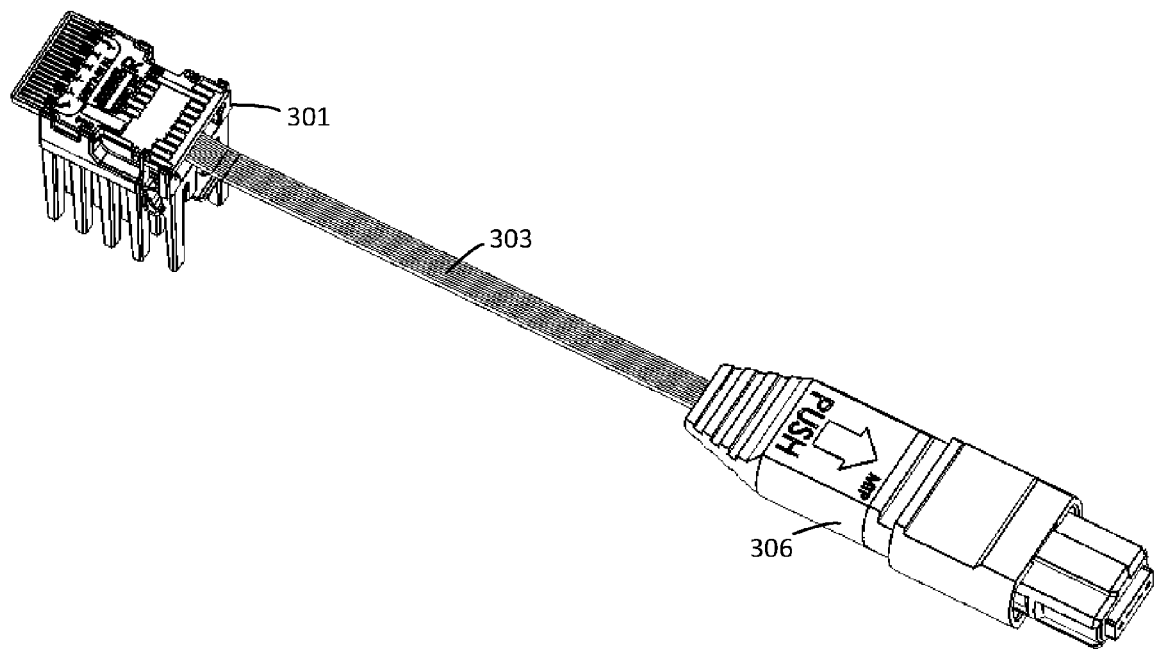
Figure 18:
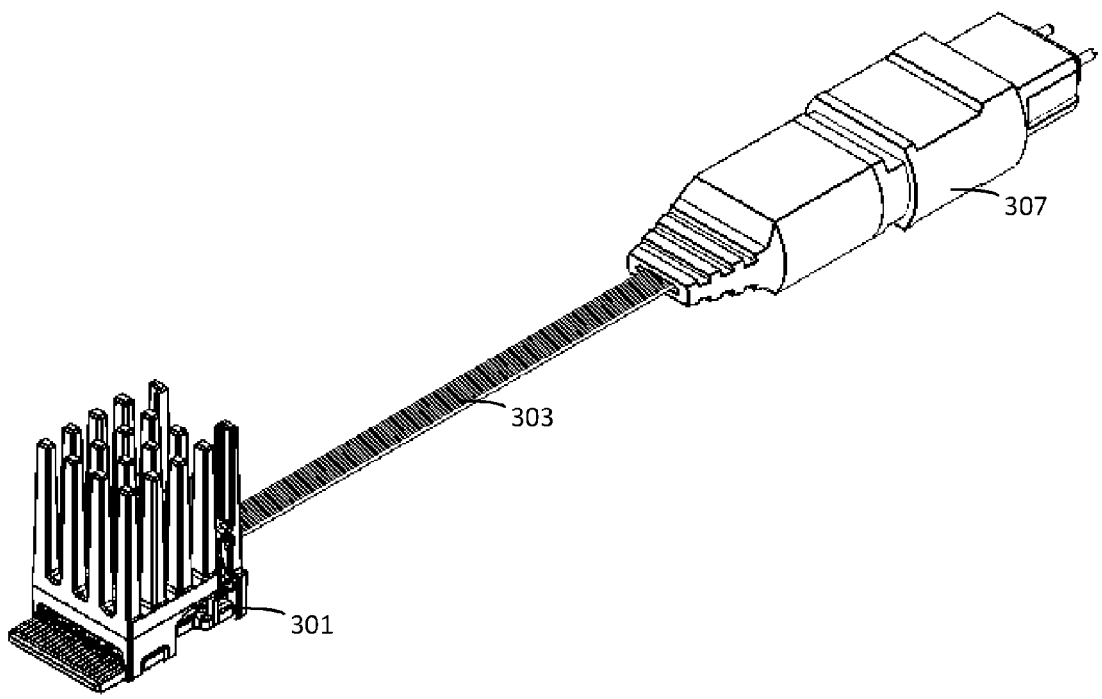
Figure 19:
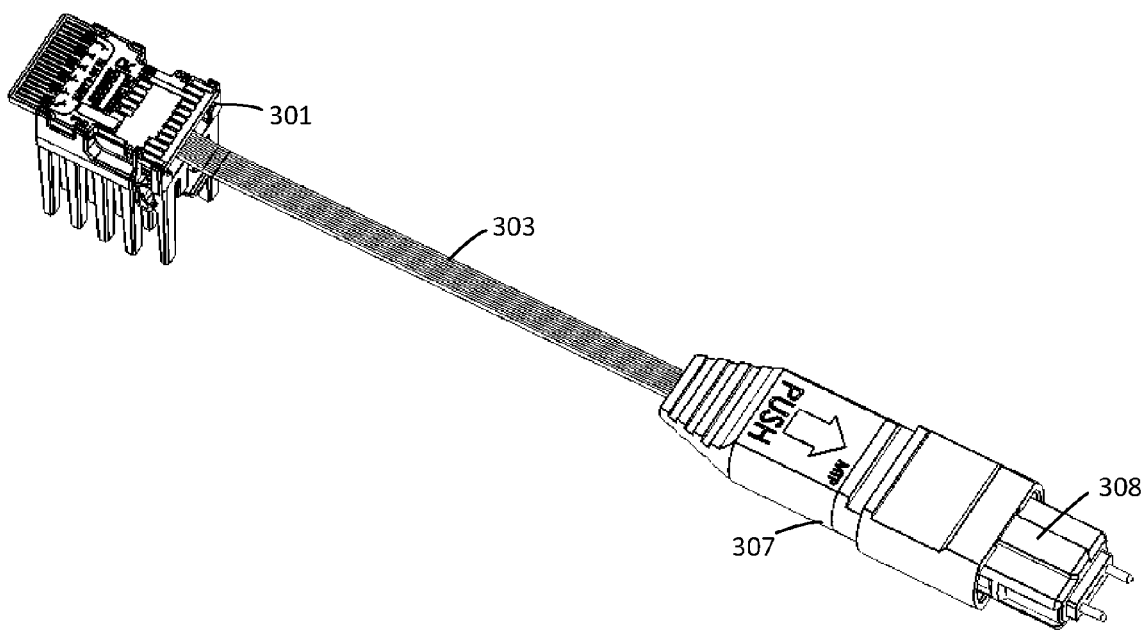
Figure 20:
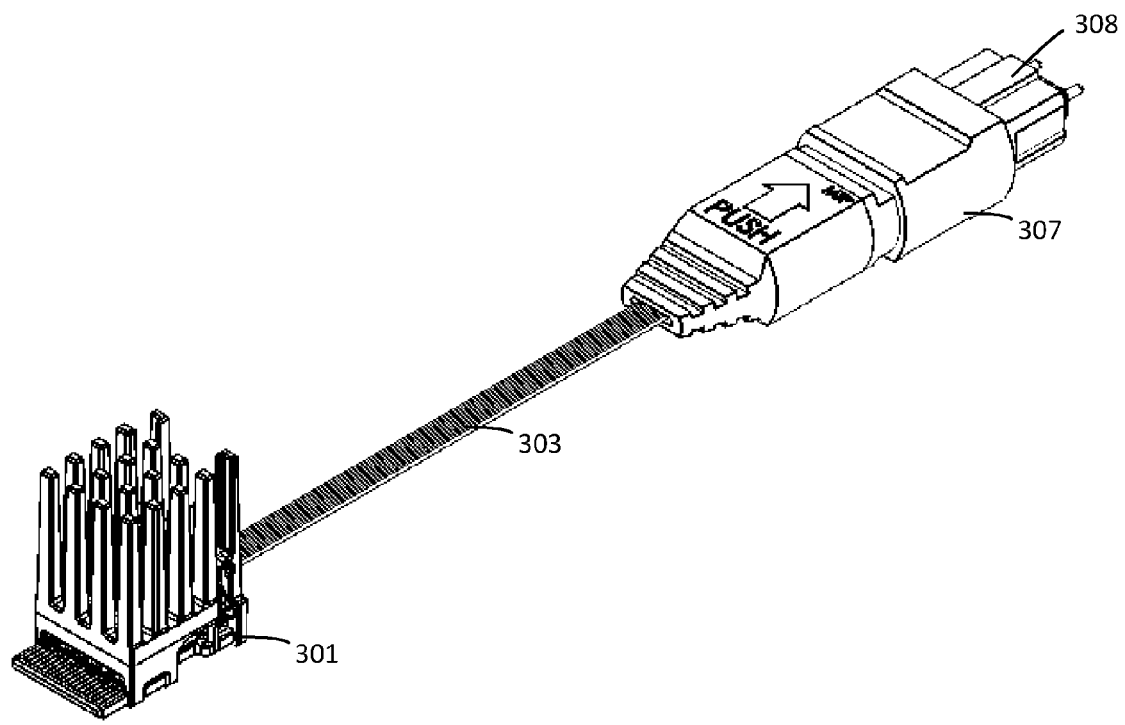
Figure 21:
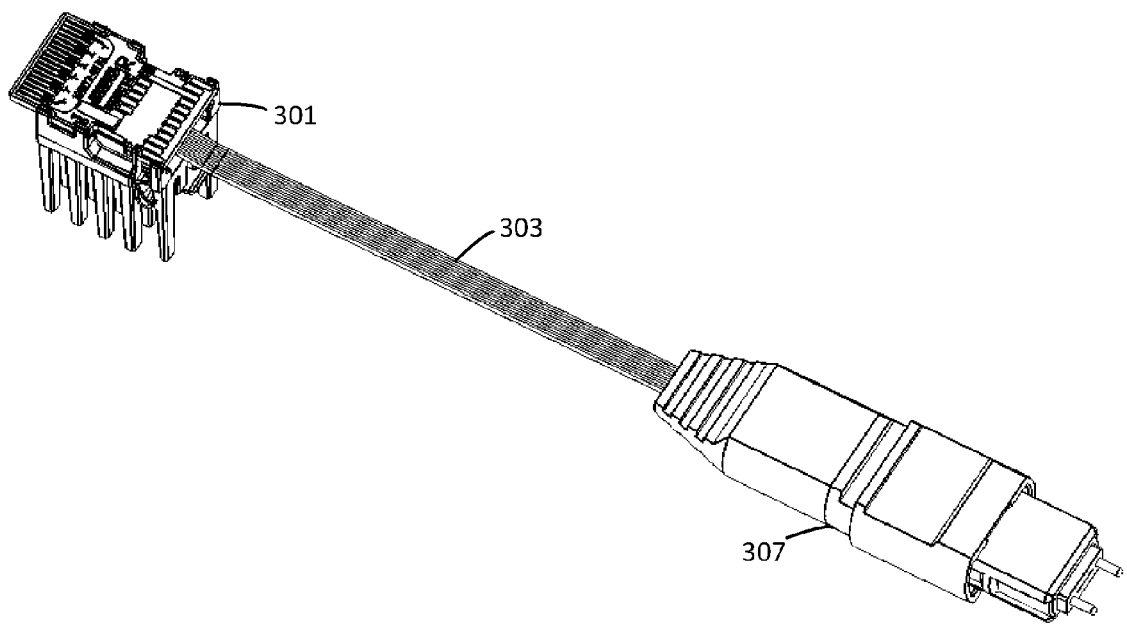
Figure 22:
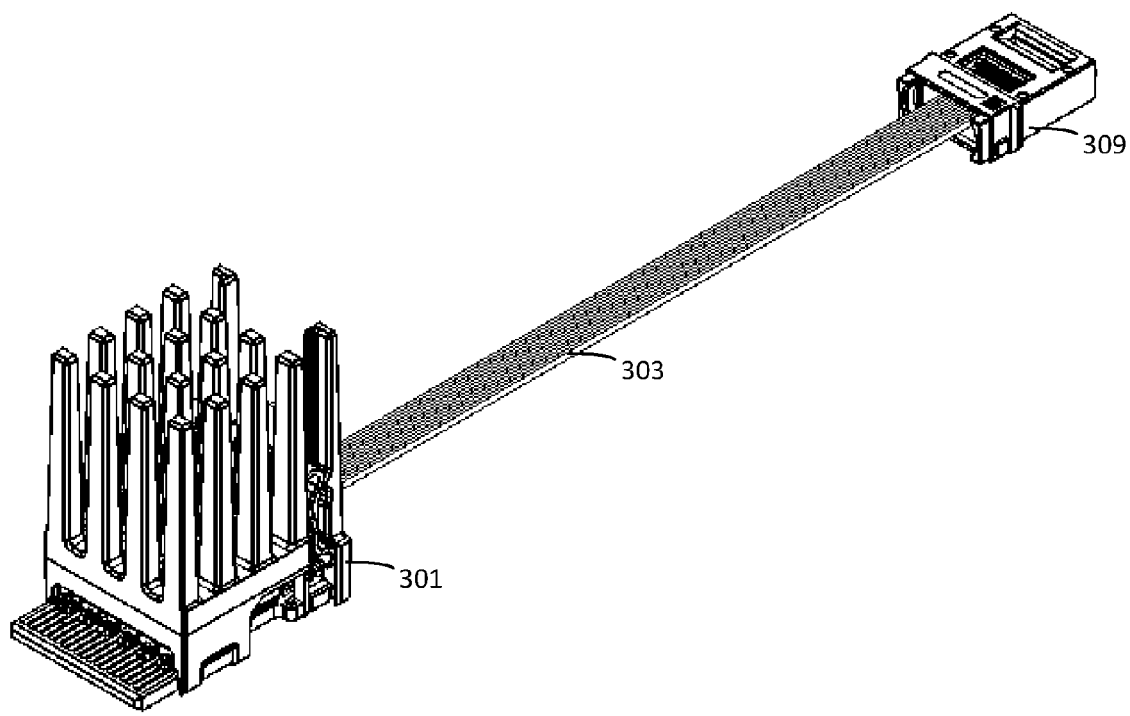
Figure 23:
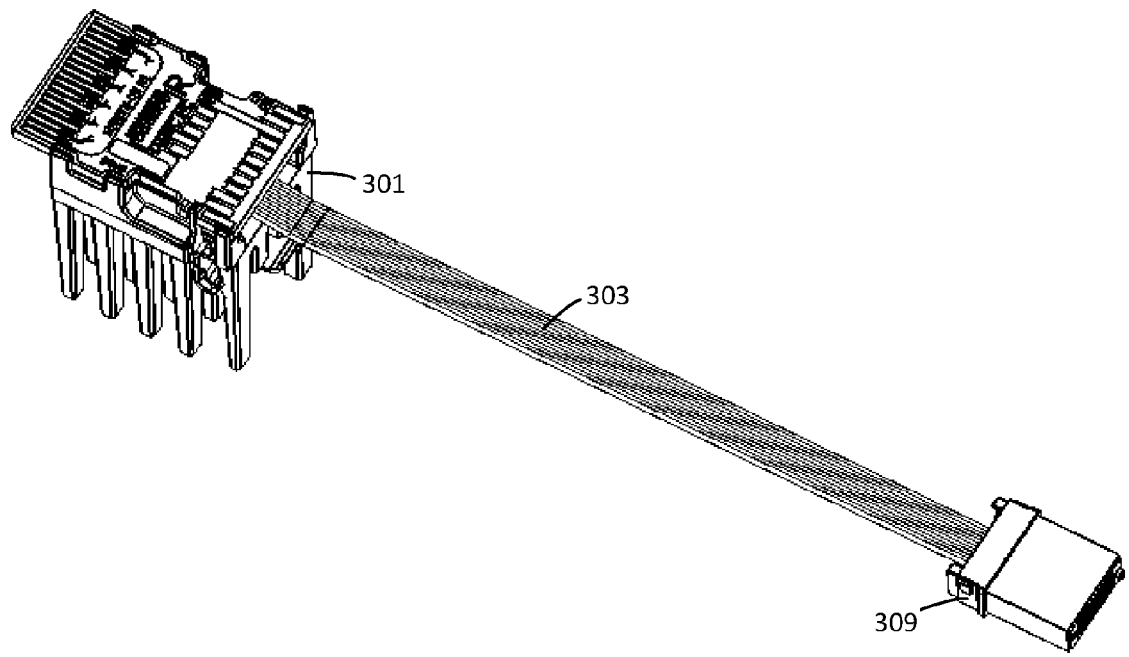
Figure 24:
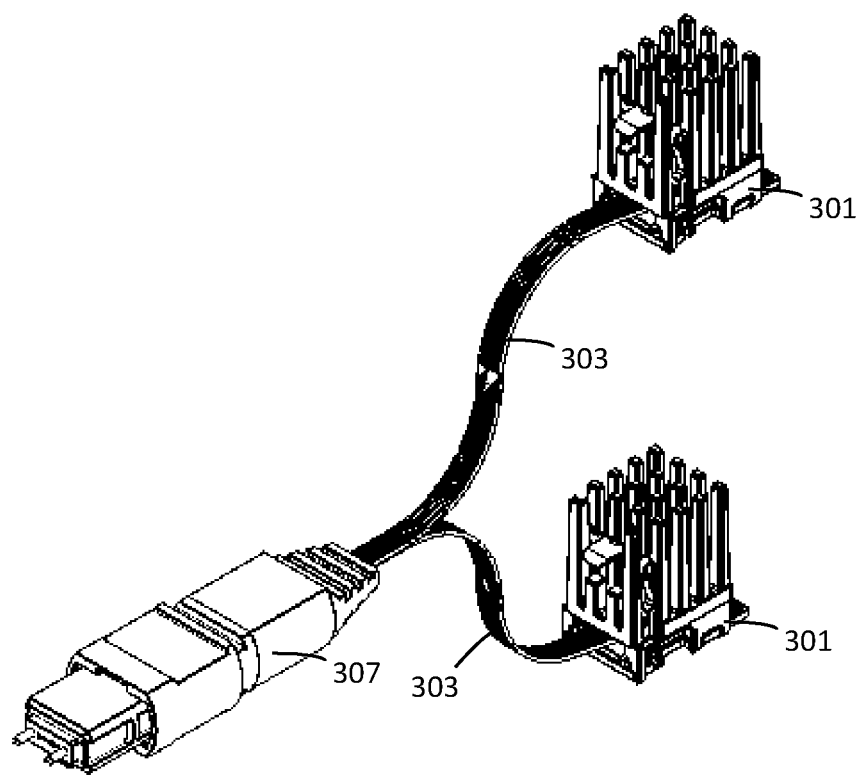
FIGS. 24 and 25 are top and bottom views of two half AOCs in a y-configuration.
Figure 25:
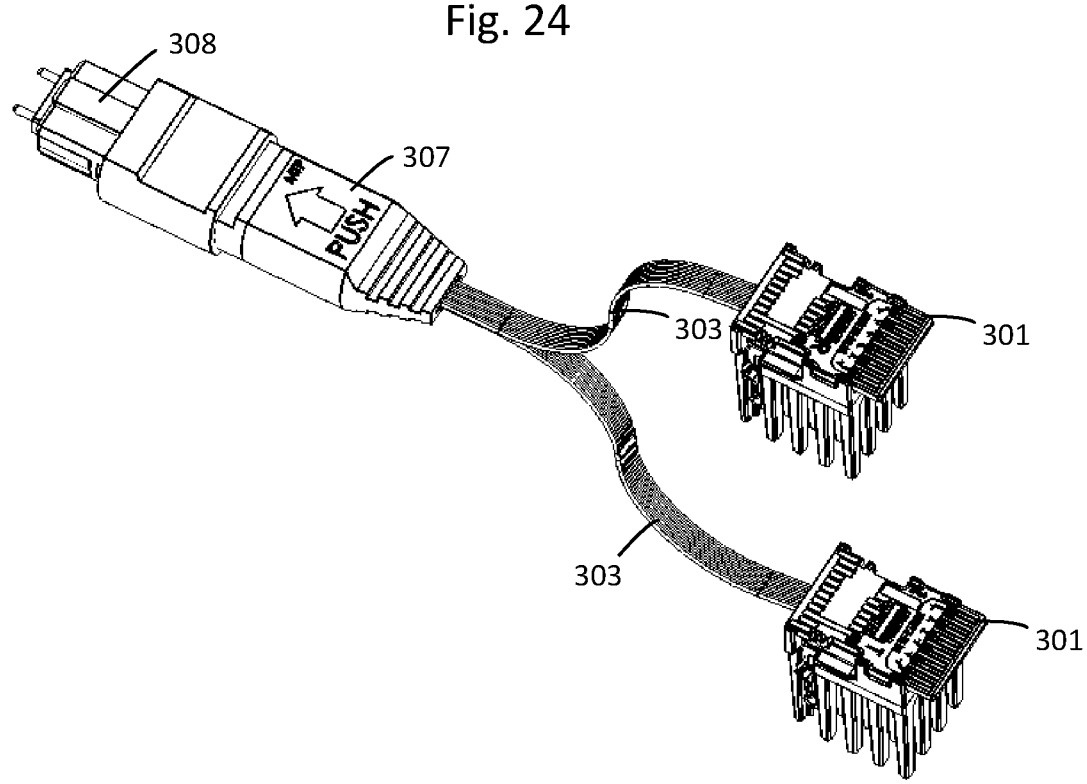

FIGS. 12 and 13 show the top and bottom of a half AOC that includes end 301 and a female MT end 304. FIGS. 14 and 15 show the top and bottom of a half AOC that includes end 301 and a male MT end 305. FIGS. 16 and 17 show the top and bottom of a half AOC that includes end 301 and a female MTP end 305. FIGS. 18 and 19 show the top and bottom of a half AOC that includes end 301 and a male MTP end 307 with the registration key 308 located on bottom. FIGS. 20 and 21 show the top and bottom of a half AOC that includes end 301 and a male MTP end 307 with the registration key 308 located on top. FIGS. 22 and 23 show the top and bottom of a half AOC that includes end 301 and a Prizm MT end 309. FIGS. 22 and 23 show the top and bottom of a Y cable that includes two ends 301 and a male MTP end 307 with the registration key 308 located on top. The female MT end 304, the male MT end 305, female MTP end 306, the male MTP end 307, and the Prizm MT end 309 are optical connectors, while end 301 is an optical-to-electrical connector.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method of determining link loss in a channel that includes a light source, a photodetector optically connected to the light source, and a transimpedance amplifier connected to an output of the photodetector, wherein the transimpedance amplifier squelches its output when optical power incident on the photodetector is below a threshold optical power, the method comprising:
   varying optical power of the light source to determine a maximum optical power of the light source at which the transimpedance amplifier squelches its output; and
   determining link loss in the channel by subtracting the maximum optical power of the light source at which the transimpedance amplifier squelches its output from the threshold optical power.

2. The method of claim 1, wherein:
   the optical power of the light source is a known function of a bias current of the light source; and
   varying optical power of the light source includes varying the bias current of the light source to produce a known optical power.

3. The method of claim 1, wherein the channel is included in a full active optical cable.

4. A communication system comprising:
   a light source;
   a photodetector optically connected to the light source; and
   a transimpedance amplifier connected to an output of the photodetector, wherein the transimpedance amplifier squelches its output when optical power incident on the photodetector is below a threshold optical power;
   memory storing a value related to an initial link loss of the communication system; and
   a processor connected to the memory; wherein
   the memory stores:
   the threshold optical power; and
   optical power values of the light source as a function of bias current; and
   the processor calculates link loss by:
   varying optical power of the light source to determine a maximum optical power of the light source at which the transimpedance amplifier squelches its output; and
   determining link loss by subtracting the maximum optical power of the light source at which the transimpedance amplifier squelches its output from the threshold optical power.

5. The communication system of claim 4, wherein the processor calculates a change in link loss by subtracting the original link loss from the determined link loss.

6. The communication system of claim 4, wherein the memory is included in the processor.

7. The communication system of claim 4, wherein the processor varies the optical power of the light source by varying a bias current of the light source to produce a known optical power based on the optical power values stored in the memory.

8. The communication system of claim 4, wherein the communication system is an active optical cable.

* * * * *